Aug. 28, 1962     M. DETTLING     3,051,311
ROTATING RING GRAIN CLEANER
Filed March 20, 1959     2 Sheets-Sheet 1

INVENTOR:
MARTIN DETTLING

Aug. 28, 1962   M. DETTLING   3,051,311
ROTATING RING GRAIN CLEANER
Filed March 20, 1959   2 Sheets-Sheet 2
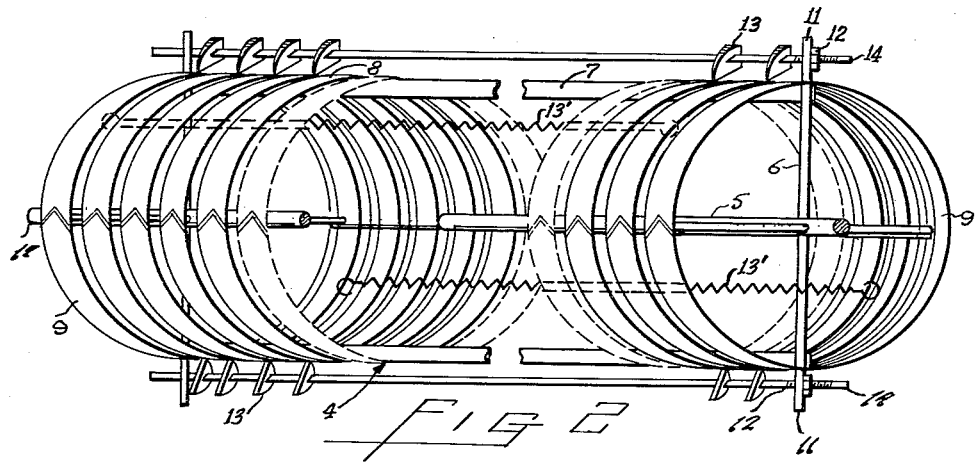
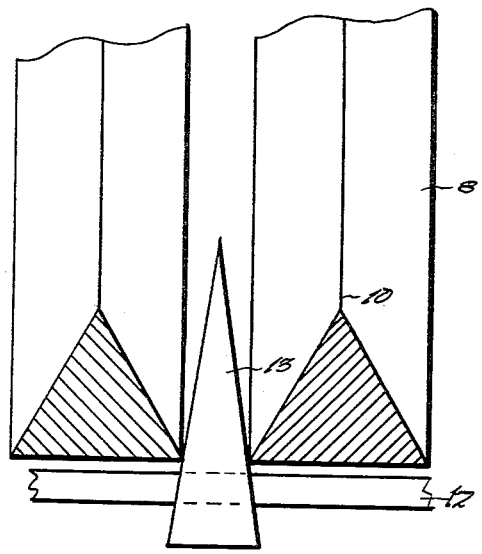
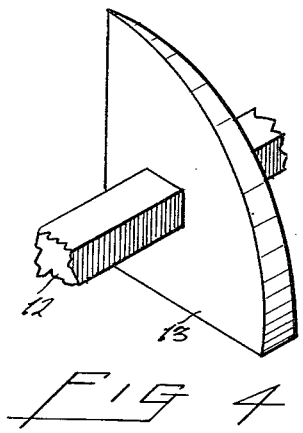
INVENTOR:
MARTIN DETTLING United States Patent Office 3,051,311
Patented Aug. 28, 1962

3,051,311
ROTATING RING GRAIN CLEANER
Martin Dettling, P.O. Box 1, Clairmont, Alberta, Canada
Filed Mar. 20, 1959, Ser. No. 800,749
8 Claims. (Cl. 209—292)

My invention relates to new and useful improvements in grain cleaners, particularly grain cleaners adapted to separate grain from chaff and weed seeds.

The conventional method of grain cleaning is to use screens and shakers, sometimes in conjunction with winnowing devices and/or pocketed disc separator.

However, all of these suffer from considerable disadvantages. For example, in the shaking system the screens tend to pass over some of the chaff with the grain so that the grain has to be reprocessed by passing it through the cleaner again.

The winnowing machine, while separating the chaff, tends to pass grain with the chaff. The pocketed disc separators, while effective for sizing grain, nevertheless do not separate the chaff, so that it is usual to utilize a combination of two or more of these types of machines in order to obtain efficient cleaning.

The present device overcomes these disadvantages by providing an inclined rotating hollow element consisting of a plurality of rings mounted upon ring holding bars and having means to adjust gaps between the rings. The grain is fed into one end of these ring cylinders which are rotating, and the gaps are such that chaff and weed seed fall therethrough whereas grain passes out of the opposite end. The horizontal bars carrying the rings also carry the grain to the upper side where it drops by gravity as the devices are rotating thus ensuring that chaff or weed seeds cannot be carried through with the cleaned grain. By adjusting the gaps between the rings varying types of grain can be cleaned and by adjusting the angle of inclination of the rotating elements, extremely efficient cleaning can be accomplished.

The principal object and essence of my invention is, therefore, to provide a device of the character herewithin described which permits both weed seeds and chaff to be separated from grain in one operation.

Another object of my invention is to provide a device of the character herewithin described in which varying types of grain can be cleaned merely by adjusting the gaps between adjacent rings.

Yet another object of my invention is to provide a device of the character herewithin described in which the efficiency of the cleaning action can be controlled by altering the angle of inclination of the rotating elements.

A still further object of my invention is to provide a device of the character herewithin described which is extremely simple in construction, economical in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 2 is a perspective view of one of the rotatable cleaning elements.

FIGURE 3 is an enlarged section of two adjacent rings showing the means to adjust the gap therebetween.

FIGURE 4 is an enlarged perspective view of one of the separating segments.

In the drawings like characters of reference indicate corresponding parts in the different figures.

Figure 1:
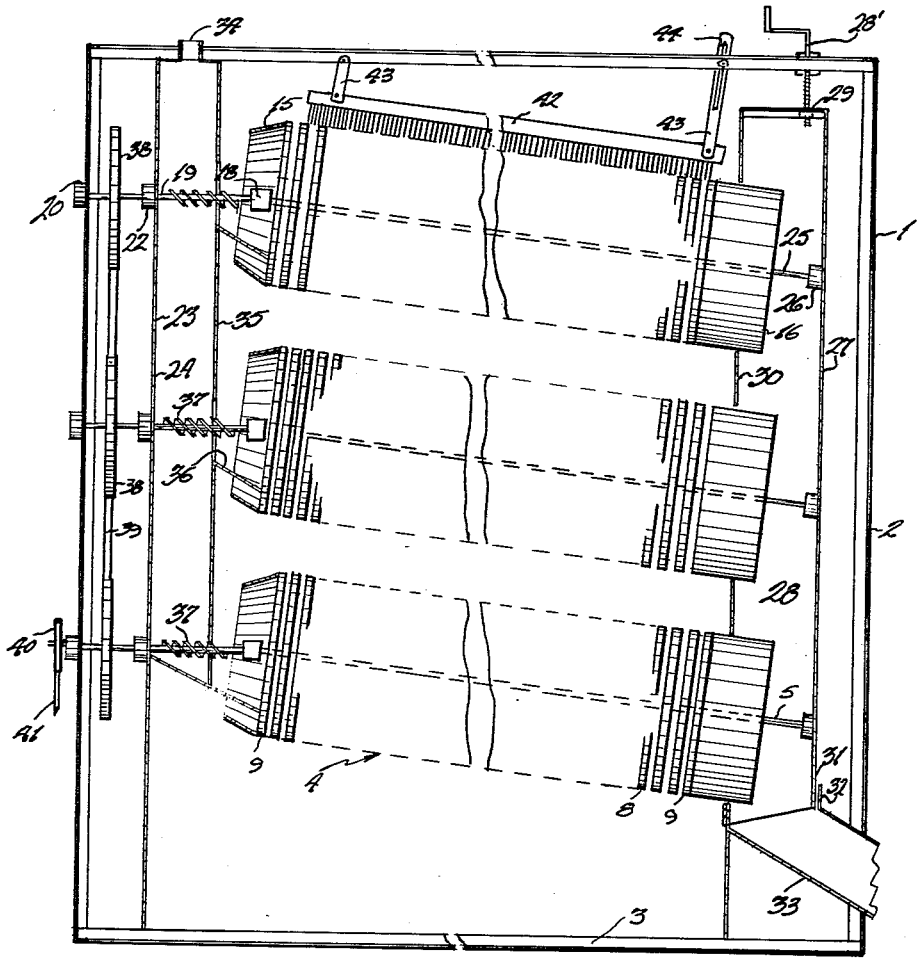
FIGURE 1 is a side elevation of my device with the spacing means deleted for clarity.

Proceeding, therefore, to describe my invention in detail, reference should be made to the accompanying drawings which shows that I have illustrated a supporting framework generally designated 1, consisting of vertical angle iron member 2 and transverse angle iron members 3, it being understood that the framework is substantially cubical and is open at the base.

Mounted, within this framework, for rotation is a plurality of grain cleaning elements collectively designated 4 and the construction is shown in detail in FIGURE 2.

A longitudinal shaft 5 carries sets of spiders 6 at each end thereof and longitudinal ring holding bars 7 extend between the extremities of the spider on one end of the shaft 5 to the extremities of the spider on the other end of said shaft.

A plurality of rings 8 is mounted around the ring holding bars, the end rings 9 being welded to the ring holding bars, the remaining rings being free upon the bars.

FIGURE 3 shows a cross sectional view of two of the rings 8 and it will be seen that they are triangular when viewed in cross section with the apices 10 facing inwardly. Depending from the ends of each ring holding bar 7 are brackets 11 adapted to carry a squared shaft 12 upon which is mounted for endwise movement a plurality of tapered segments 13. One of these segments is adapted to enter between every pair of adjacent rings and by manually rotating the square shaft 12, the gaps are widened or narrowed as desired. To faciliate this a portion near one end 14 of the squared shaft is cylindrical and is screw-threaded to engage a corresponding screw-threaded aperture within one of the brackets 11. Although only one squared shaft 12 is illustrated in FIGURE 3, it will be appreciated that it is desirable to provide a further shaft diametrically opposite to that shown, said shaft also carrying segments 13 in order to provide equal spacing between the rings. This is shown in FIGURE 2.

Each element 4 is provided with a tapered open portion 15 and the other ends are provided with an open cylindrical portion 16, the tapered portion 15 being the intake end of the elements and the cylindrical portion being the discharge end thereof. Springs 13' extend between the two rings next to the end ring thus maintaining the rings at the minimum spacing permitted by the positioning of the tapered segments 13.

The end 17 of the shaft 5 adjacent the intake end is connected via a universal joint 18 to a horizontal shaft extension 19 which is journalled for rotation within bearing 20 on the framework 1 and bearings 22 which are secured to the outer surface of one wall 23 of a feed trunk 24 hereinafter to be described.

The shaft 5 together with the elements carried thereby incline downwardly from the intake end 15 to the discharge end 16 and the ends 25 of the shaft are supported for rotation within further bearings 26 mounted upon the inner face of wall 27 of a discharge duct 28. This discharge duct, which supports the lower end of the elements, is capable of limited upward and downward movement by means of crank 28' journalled within the upper portion of the framework and being screw-threadably engageable as at 29 and the cylindrical portion 16 of the elements passes through apertures within wall 30 of this discharge duct.

The lower end 31 of this duct is freed within an extension 32 of a stationary collecting duct 33 which may extend to any conventional means of clean grain collection.

The aforementioned feed duct 24 takes the form of a vertical trunk into which grain may be fed through entrance 34 from a hopper (not illustrated) or any other convenient storage container and it will be observed that the wall 35 of this trunk is apertured adjacent the intake end 15 of the cleaning elements which are arranged one above the other. Flanges 36 extend from the lower edges of these openings into the intake end 15 and auger slicers 37 are mounted upon these shaft extensions 19 within the feed trunk. From the foregoing, it will be appreciated that the feed trunk fills with grain which is then augered individually to the cleaning elements. The portions of the horizontal shaft 19 exterior of the feed trunk and between bearings 20 and 22, are provided with pulleys 38 secured thereto, over which belt 39 engages. One of the shafts 19 extends upwardly of the framework and carries a drive pulley 40 secured thereto, which in turn is engaged by a drive belt 41 extending from a source of power (not illustrated) so that rotation of one of the elements causes rotation of the others due to the engagement of the belt 39 around the associated pulley 38.

A brush, only one of which is shown, 42 engages the outer surfaces of each of the elements preferably at the upper side thereof, to ensure that chaff and the like is cleaned from the rings and this brush is mounted upon pivoted links 43 depending from the supporting framework, one of these links being slotted as at 44 so that the brush, by gravity, always engages the upper surface of the rings.

In operation, the gaps between the rings are adjusted as hereinbefore described, depending upon the type of grain being passed through the machine and the angle of inclination of the elements is also adjusted depending upon the amount of foreign matter in the grain.

The grain to be cleaned is then fed into the vertical trunk and is augered into the upper ends of each element which are rotating. The grain passes gradually through the elements due to the inclination thereof, and the ring holding bars 7 lift the grain up and dump it downwardly to ensure that all chaff and weed seeds pass through the gaps between the rings. The cleaned grain passes through the cylindrical end 16 into the collecting or discharge duct 27 and then out through the duct 33.

The chaff and weed seeds passing between the rings, which are kept cleaned by means of brushes 42, it being deposited at the base of the machine and may be collected in any convenient manner.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A grain cleaner comprising in combination a supporting framework, a plurality of grain cleaning elements supported for rotation within said framework and superposed one above the other, said elements inclining downwardly from one side of said framework to the other, means to rotate said elements, each of said elements including a central shaft, a set of spiders on each end of said shaft, and horizontal ring holding bars extending between the extremities of the set of spiders on one end of said shaft and the extremities of the set of spiders on the other end of said shaft, a plurality of screening rings mounted around said ring holding bars, the end rings being secured to said bars, the remaining rings being free on said bars, means to adjust the gaps between adjacent rings within limits, means to feed grain to be cleaned into the upper ends of said elements, and means to collect clean grain from the lower ends of said elements, said means to adjust the gaps between adjacent rings comprising a cross shaft supported from each of said ring holding bars externally of said rings, a plurality of tapered segments mounted for endwise movement to said cross shaft and entering between each pair of adjacent rings whereby partial rotation of said cross shaft forces said segments between said rings.

2. The device according to claim 1 which includes means to adjust the inclination of said elements within limits.

3. The device according to claim 1 in which said means to feed grain into said elements includes a vertical trunk within said framework into which grain may be fed, said shafts extending via a universal joint, transversely across said trunk, and augers on said shaft extensions, said trunk being apertured adjacent each element.

4. The device according to claim 2 in which said means to feed grain into said elements includes a vertical trunk within said framework into which grain may be fed, said shafts extending via a universal joint, transversely across said trunk, and augers on said shaft extensions, said trunk being apertured adjacent each element.

5. The device according to claim 1 in which each of said rings is triangular when viewed in cross section, the apices of said triangular configuration facing inwardly.

6. The device according to claim 2 in which each of said rings is triangular when viewed in cross section, the apices of said triangular configuration facing inwardly.

7. The device according to claim 3 in which each of said rings is triangular when viewed in cross section, the apices of said triangular configuration facing inwardly.

8. The device according to claim 4 in which each of said rings is triangular when viewed in cross section, the apices of said triangular configuration facing inwardly.

References Cited in the file of this patent

UNITED STATES PATENTS

| | | |
|---|---|---|
| 855,981 | Rich | June 4, 1907 |
| 892,825 | Goss | July 7, 1908 |
| 918,912 | Rich | Apr. 20, 1909 |
| 1,484,025 | Hofer | Feb. 19, 1924 |
| 2,669,268 | Meyer | Feb. 16, 1954 |
| 2,687,212 | Kerr et al. | Aug. 24, 1954 |
| 2,759,695 | Valdes | Aug. 7, 1956 |
| 2,964,185 | Katoh | Dec. 13, 1960 |